United States Patent Office.

KARL KREKELER, EDUARD MARTZ, AND ADOLF ISRAEL, OF ELBERFELD, GERMANY, ASSIGNORS TO THE FARBENFABRIKEN OF ELBERFELD COMPANY, OF NEW YORK, N. Y.

GRAY TRISAZO DYE.

SPECIFICATION forming part of Letters Patent No. 603,646, dated May 10, 1898.

Application filed December 14, 1897. Serial No. 661,855. (Specimens.) Patented in Germany September 15, 1891, No. 65,262; in England December 28, 1891, No. 22,641; in France April 28, 1892, No 221,233; in Italy June 30, 1892, XXVI, 32,191, LXIII, 186, and in Austria-Hungary October 3, 1892, No. 1,242 and No. 16,870.

*To all whom it may concern:*

Be it known that we, KARL KREKELER, EDUARD MARTZ, and ADOLF ISRAEL, doctors of philosophy, chemists, residing at Elberfeld, Germany, (assignors to the FARBENFABRIKEN OF ELBERFELD COMPANY, of New York,) have invented a new and useful Improvement in the Manufacture of Gray Trisazo Dyes, (for which the Farbenfabriken, vormals Fr. Bayer & Co., of Elberfeld, Germany, has already obtained Letters Patent in Germany, No. 65,262, dated September 15, 1891; in England, No. 22,641, dated December 28, 1891; in France, No. 221,233, dated April 28, 1892; in Italy, Reg. Gen., Vol. XXVI, No. 32,191, Reg. Attest, Vol. LXIII, No. 186, dated June 30, 1892, and in Austria-Hungary, No. 1,242 and No. 16,870, dated October 3, 1892;) and we hereby declare the following to be a clear and exact description of our invention.

Our invention relates to the production of a new class of trisazo dyestuffs by diazotizing tetrazo bodies of the general formula:

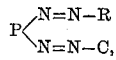

in which formula P represents a radical of the benzidin series, such as diphenyl, ditolyl, diphenol ether, or the like, R the radical of an orthooxycarbonic acid of the benzene series, such as salicylic acid or cresotinic, and C the radical of the so-called "Clève's" alpha-naphthylamin-beta-sulfonic-acid, (1.6 or 1.7,) and combining the diazo body thus obtained with one molecule of 1 naphthol and 4 or 5 monosulfo-acid. The dyestuffs thus obtained have the general formula:

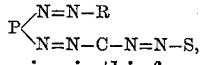

P, R, and C meaning in this formula the above-defined radicals, and S the radical of 1.4 or 1.5 naphtholmonosulfo-acid. They represent black powders which dissolve in water with a greenish-gray color and dye unmordanted cotton greenish-gray shades.

In carrying out our new process practically we can proceed as follows: 18.4 kilos, by weight, of benzidin are diazotized in the usual manner by means of fourteen kilos, by weight, of sodium nitrite. To the icy-cold diazo solution an icy-cold solution of fourteen kilos, by weight, of salicylic acid and seventy kilos, by weight, of sodium carbonate ($Na_2CO_3$) in four hundred liters of water is added with stirring. When the formation of the intermediate product is finished, a cold solution prepared by dissolving 24.5 kilos, by weight, of the sodium salt of alpha-naphthylamin-beta-monosulfo acid (1.6) in three hundred liters of water is added. After about a three hours' stirring the formation of the intermediate dyestuff is complete. The mixture is subsequently acidulated by means of hydrochloric acid and filtered. The dyestuff acid thus obtained is dissolved in fifteen hundred liters of a 2.5 per cent. soda-lye, then quickly mixed with a solution of eight kilos, by weight, of sodium nitrite, five hundred kilos, by weight, of ice, and one hundred and fifty kilos, by weight, of hydrochloric acid (20° Baumé.) This mixture is stirred for about twelve hours, and then the resulting insoluble diazo compound is filtered and pressed. Subsequently it is mixed with ice and water to a thin paste, which is slowly stirred into an icy-cold concentrated solution of 24.6 kilos, by weight, of the sodium salt of 1.4 naphtholmonosulfo-acid and one hundred and forty kilos, by weight, of sodium carbonate. After stirring for twelve hours the mixture is heated to about 70° centigrade. The dyestuff thus complete is salted out in the usual manner. Then it is filtered off, pressed, dried, and pulverized. It is the sodium salt of an acid having the formula:

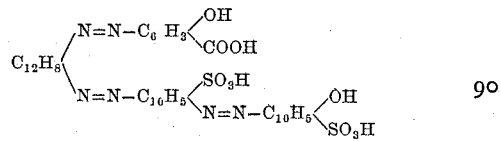

and represents a black powder soluble in water with a greenish-gray color, in concentrated sulfuric acid with a blue-black color. From this solution a black flaky precipitate is obtained on the addition of a sufficient quantity of ice.

The new coloring-matter dyes unmordanted cotton greenish-gray shades.

Having now described our invention and in what manner the same is to be performed, what we claim as new, and desire to secure by Letters Patent, is—

1. The process for producing new trisazo dyestuffs by combining the diazo derivatives of the disazo compounds hereinbefore defined of the general formula

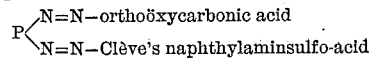

with one molecule of 1.4 or 1.5 naphtholmonosulfo-acid, substantially as described.

2. The process for producing a new trisazo dyestuff by combining the diazo derivative of the body having the formula

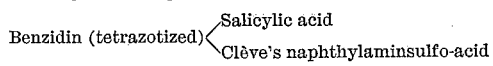

with one molecule of 1.4 naphtholmonosulfo-acid substantially as described.

3. As new articles of manufacture the new trisazo dyestuffs obtainable from the diazo derivatives of the disazo compounds of the general formula:

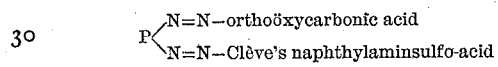

by combination with one molecule of 1.4 or 1.5 naphtholmonosulfo-acid, being dark powders, soluble in water with greenish-gray color dyeing unmordanted cotton greenish-gray shades substantially as described.

4. As a new article of manufacture the specific dyestuff obtainable from the diazo derivative of the body having the formula

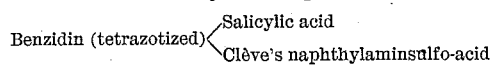

by combination with one molecule of 1.4 naphtholmonosulfo-acid, being an alkaline salt of an acid having the formula

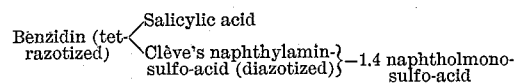

representing in the form of the sodium salt a dark-brown powder, soluble in water with a greenish-gray color, in concentrated sulfuric acid with a blue-black color from which solution a black flaky precipitate is obtained on the addition of a sufficient quantity of ice, dyeing unmordanted cotton greenish-gray shades substantially as described.

In testimony whereof we have signed our names in the presence of two subscribing witnesses.

KARL KREKELER.
EDUARD MARTZ.
ADOLF ISRAEL.

Witnesses:
R. E. JAHN,
OTTO KÖNIG.

It is hereby certified that in Letters Patent No. 603,646, granted May 10, 1898, upon the application of Karl Krekeler, Eduard Martz, and Adolf Israel, of Elberfeld, Germany, for an improvement in "Gray Trisazo Dyes," an error appears in the printed specification requiring correction, as follows: In line 36, page 1, the word "and" should be stricken out; and that the said Letters Patent should be read with this correction therein that the same may conform to the record of the case in the Patent Office.

Signed, countersigned, and sealed this 17th day of May, A. D., 1898.

[SEAL.]                                             WEBSTER DAVIS,
*Assistant Secretary of the Interior.*

Countersigned:
   C. H. DUELL,
      *Commissioner of Patents.*